April 28, 1959 L. M. GERMAIN 2,884,493

LOW DRIFT MAGNETIC AMPLIFIER

Filed Sept. 7, 1956

INVENTOR.
LLOYD M. GERMAIN
BY
Eli Weiss
ATTORNEY

United States Patent Office 2,884,493
Patented Apr. 28, 1959

2,884,493

LOW DRIFT MAGNETIC AMPLIFIER

Lloyd M. Germain, New York, N.Y., assignor, by mesne assignments, to Burroughs Corporation, Detroit, Mich., a corporation of Michigan Application September 7, 1956, Serial No. 610,437

10 Claims. (Cl. 179—171)

This invention relates generally to a magnetic amplifier and more particularly to a magnetic amplifier that is substantially free of drift.

The basic unit of a magnetic amplifier consists primarily, of two separate windings, a power winding and a control winding, each wound around a magnetic core. The power winding is coupled, in series, to a crystal diode at one end and a load resistor at the other end. A source of power pulses is coupled to feed the crystal diode, and a ground terminal is coupled to the load resistor. The control winding determines the degree of magnetic saturation of the magnetic core. The crystal diode allows current to flow in one direction only and, if perfect, prevents the flow of current from reversing in the power winding. The magnetic saturation of the core can not go lower than that value determined by the current that flows in the control winding.

In actual practice, however, the crystal diode is not perfect and, as such, a small amount of leakage or reverse current flows through the crystal diode when the alternating voltage input reverses polarity. The leakage current of the diode, flows through the many turns of the power winding, to reset the core independently of the control circuit, and spurious outputs result.

Presently, to decrease the drift of a magnetic amplifier, two basic units are coupled electrically in parallel and the differential of the voltage outputs of the two legs is detected. For perfectly matched crystal diodes, cores, resistors, and coil windings, a perfect balance between the two legs can be achieved and the voltage differential between the two legs will be zero. However, it is almost impossible to obtain two perfectly matched crystal diodes as the magnitude of the leakage current that is passed by each crystal diode is random in nature and its value is unpredictable. Thus the parallel coupled magnetic cores are saturated to different levels and produce different output voltages. To equalize the flow of leakage current through each of the basic units, a resistor is shunted across that diode that passes the least leakage current. In this inefficient and unpredictable manner the flow of leakage current through each of the legs is equalized.

It is accordingly a primary object of the present invention to provide a magnetic amplifier that is substantially free of drift.

A further object of the present invention is to provide a device that is reliable in operation and economical to produce.

Another object of the present invention is to provide a magnetic amplifier that does not require custom modifications for accurate operation.

Other objects and many of the attendant advantages of this invention will be readily appreciated as the apparatus becomes better understood by reference to the following detailed description when considered in connection with the accompanying drawings wherein.

Figure 1:
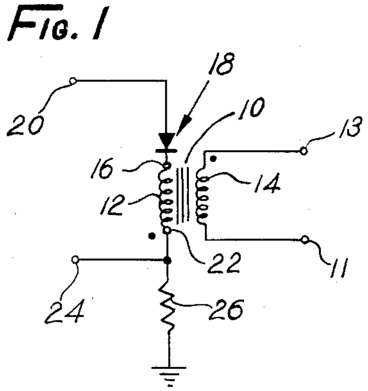
Figs. 1 and 2 are schematic representations of basic amplifiers of the magnetic type.

Referring to Fig. 1, the basic magnetic amplifier comprises a core 10 possessing preferably a rectangular shaped hysteresis loop. The core 10 supports a power or output winding 12 and a signal or input winding 14. One end 16 of the power winding 12 is coupled to the cathode of a crystal diode 18; the anode of the crystal diode 18 is coupled to an input terminal 20 to receive a plurality of alternately spaced positive and negative potential signals. The other end 22 of the power winding is coupled to a ground terminal through a resistor 26. An output terminal 24 is coupled to the junction of the power winding 12 and the resistor 26.

The hysteresis loop of the magnetic core utilized in this invention is substantially rectangular in shape and can be made of ferrites or magnetic tapes.

The heat treatment of the cores can vary in accordance with the properties desired. In addition to the wide variety of materials available, the cores utilized can have any one of a number of different geometrical shapes or configurations, and the core can have continuously closed or partially open magnetic path.

The present invention is not restricted to the utilization of any one specific material or core configuration, the bar type of cores illustrated are for ease of representation only. Nor is the present invention limited to the utilization of materials having hysteresis loops substantially rectangular in shape, this characteristic was chosen for illustration purposes only. Thus, neither the configuration nor the physical characteristics of the core shown are critical and any one of many configurations and physical characteristics known to those skilled in the art can be utilized.

In the drawings the dot representation is utilized to represent the direction of the coil windings by indicating like polarities of associated coils at any particular instant. Thus, referring to Fig. 1, the polarity of the end 22 of coil 12 will always be identical with the polarity of the uper end of coil 14.

Figure 3:
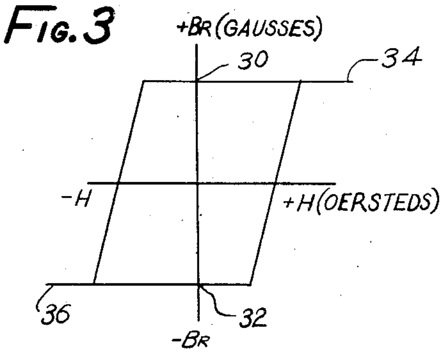
Fig. 3 is an idealized hysteresis loop of a magnetic material which can preferably be utilized in the cores of the magnetic amplifiers utilized in this invention.

Referring to Fig. 3, therein is shown a substantially rectangular hysteresis loop. In material having magnetic properties, the term remanence (Br) applies to that value of induction that remains after the removal of a field that produces magnetic saturation. Therefore, the point indicated by the numeral 30 of Fig. 3 represents a point of positive remanence (+); the point indicated by the numeral 32 represents a point of negative remanence (—Br); the point indicated by the numeral 34 represents positive saturation; and the point indicated by the numeral 36 represents a point of negative saturation.

For purpose of illustration, it shall be assumed that a single coil of wire is wound around a magnetic core that has a substantially square hystersis loop as shown in Fig. 1. If the core is magnetically saturated to the point 30 of Fig. 3 and current is passed through the coil of wire in a direction tending to increase the flux in the core in the same direction, the core will be driven from the point 30 to the point 34. During this state of operation there is relatively little flux change in the core and the coil presents a relatively low impedance. Thus, the energy fed to the coil 12 during this state will pass through the coil to be detected and utilized. However, if the coil were at the negative condition represented by the numeral 32 prior to the application of the signal through the coil, the core would have been driven from the point 32 to the point 34. During the occurrence of the last mentioned cycle there would be a relatively large flux change in the core and, as such, the coil would present a relatively high impedance to the applied signal. Thus, if the input signal is of the proper magnitude and the core is at the point 32 of the curve of Fig. 3, then substantially all of the energy of the input signal will be expended in magnetically driving the core from the point 32 to the region represented by the point 34, and a negligible amount of the input energy will pass through the coil to the output terminal.

Therefore the magnetic condition of the core at the time of the application of the input signal will determine whether an output signal will be present or absent. If the core is, magnetically, at the point indicated by the numeral 30, a relatively large output will be present. If, however, the core is, magnetically, at the point represented by the numeral 32, a relatively small and undetectable output signal will be present.

Figure 4:
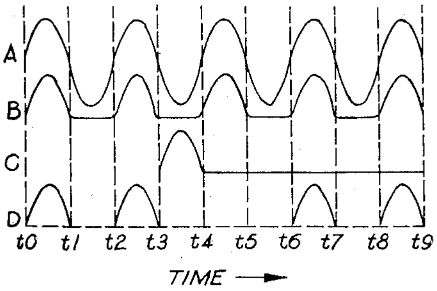
Fig. 4 illustrates wave forms that are present during the operation of the basic amplifier of the magnetic type as illustrated in Fig. 1.

Referring now to the basic magnetic amplifier shown in Fig. 1, and to the associated wave forms shown in Fig. 4, it shall be assumed for the purpose of this discussion, that the power pulses curve A of Fig. 4, are sinusoidal in shape and vary in equal amplitudes of plus and minus X volts about the zero potential reference line. The power pulses are fed from the input terminal 20 to the crystal diode 18 where each negative portion of the power wave is presented with a high impedance and inhibited substantially from passing through to the coil 16. The crystal diode, however, is not a perfect rectifier, and, as such, a small amount of reverse current does flow through the coil 12. For the following explanation only it shall be assumed that the crystal diode is perfect, and all negative potentials are blocked. The voltage wave that appears at the output of the crystal diode 18 is shown graphically by the curve B of Fig. 4. It shall now be assumed that the core is initially at the positive remanence condition represented by numeral 30 of Fig. 3. A positive potential power pulse is applied to the terminal 20 during the time interval $t0$—$t1$, and passes through the diode 18 and the relatively low impedance power coil 12 to the output terminal 24. Thus, the power pulse appears at the output terminal 24 during the time interval $t0$—$t1$ as represented by curve D of Fig. 4.

As the power pulse returns to zero potential, indicated by curve A of Fig. 4 at the time $t1$, the core returns to the operating point represented by the numeral 30 of Fig. 3, and remains at this point until the arrival of the next positive going power pulse, as indicated by curve A, at the time $t2$; at which time the core is again driven to saturation, and an output signal again appears at the output terminal 24. Thus, with a perfect crystal diode, and in the absence of any control signal or resetting signal, an output pulse will appear at the output terminal 24 at each instant that a positive going power pulse appears at the power input terminal 20. If, however, a positive going pulse is applied to the input terminals of the control winding 14 when the power pulse is negative, and the coils are oriented as shown, wherein the control winding 14 is wound opposite in direction to the power coil 12; then the positive going control signal represented by curve C of Fig. 4 during time $t3$—$t4$ will drive the magnetic core in a negative direction towards numeral 36 of Fig. 3. Then, as the control signal returns to zero potential at the time $t4$, the core will be, magnetically, at the point represented by the numeral 32. The next appearing positive potential of the power pulse occurs during the time interval $t4$—$t5$ and is presented with a relatively high impedance. Under these conditions a substantial portion of the energy of the power pulse is utilized in driving the magnetic core to the region represented by the numeral 34 and an output signal is not produced. Therefore, the application of a control signal to the control winding 14 during that time interval when the power signal is negative will prevent the generation of a signal at the output terminal.

At the time $t5$, or immediately after inhibiting the output signal, the core is magnetically at the point represented by the numeral 30 and, if another control signal is not applied to the control winding 14, the next appearing positive pulse of the power signal that appears during the time $t6$—$t7$ will drive the magnetic core to saturation and a signal will apear at the output terminal 24.

Figure 2:
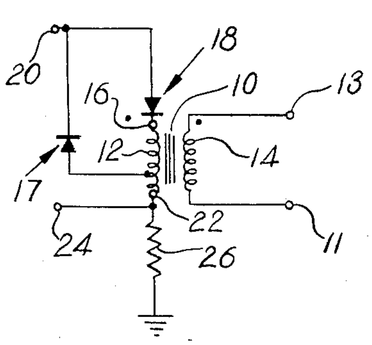

In some circuit arrangements it is desirable to obtain an output signal that is in coincidence with the occurrence of the first appearing positive pulse of the power signal that appears immediately after the occurrence of the control signal. This can be accomplished by connecting a second crystal diode 17, as shown in Fig. 2, and reversing the control winding 14 so that the power winding 12 and the control winding 14 are wound in the same direction. One end of the crystal diode 17 is coupled to the power input terminal 20, and its other end to a relatively small number of turns of the power winding 12. This arrangement allows a negative signal having a predetermined amplitude to pass through a portion of the power coil to drive the core to that region of the curve of Fig. 3 represented by the numeral 36. If a control signal is not present, the next appearing positive portion of the power signal will drive the magnetic core to that region of the curve represented by the numeral 34, and there will not be any output signal. If, however, a control signal is fed to the control winding 14 when the power signal appearing at the input terminal 20 is negative, then the control signal will override the resetting effect of the negative portion of the power wave to bias or drive the magnetic core to the positive portion of the hysteresis curve represented by the numeral 34, and a signal will appear at the output terminal 24 during the occurrence of the next positive pulse signal of the power wave. If a control signal is not fed to the control winding during the occurrence of the next appearing negative portion of the power wave, then the core will be driven into the negative remanence region represented by the numeral 36, and the next appearing positive pulse of the power wave will be expended in driving the core to the positive remanence region 34, and no signal will appear at the output terminal.

The above discussion assumed that the crystal diode utilized was perfect; that is, there was no leakage or feedback current flowing through the crystal diode when the power pulses were negative. The crystal diode utilized in the circuit described, allowed only the positive portion of the power wave to pass through to the power winding; the negative portion was blocked completely. In practice, however, every crystal diode permits a small amount of negative or leakage current to flow. The magnitude of the flow of leakage current is a distinctive characteristic of each crystal diode. It is unpredictable and varies with each crystal diode.

Referring to Fig. 1 (as originally presented without the crystal diode 17), with a perfect crystal diode it becomes obvious that the magnetization of the core can not go any lower than that value determined by the magnitude of the current in the control winding. However, the leakage current of the crystal diode 18 that flows through the many turns of the power winding can reset or drive the magnetic core to the negative remanence portion 36 of the hysteresis curve independently of the control circuit to produce an undesired output signal. The abscissa of the BH curve, Fig. 3 is proportioned to ampere-turns; thus it is possible that the leakage current can reset or drive the core further into the negative remanence region 36 than would ordinarily occur when the control current is utilized as a resetting signal.

Figure 5:
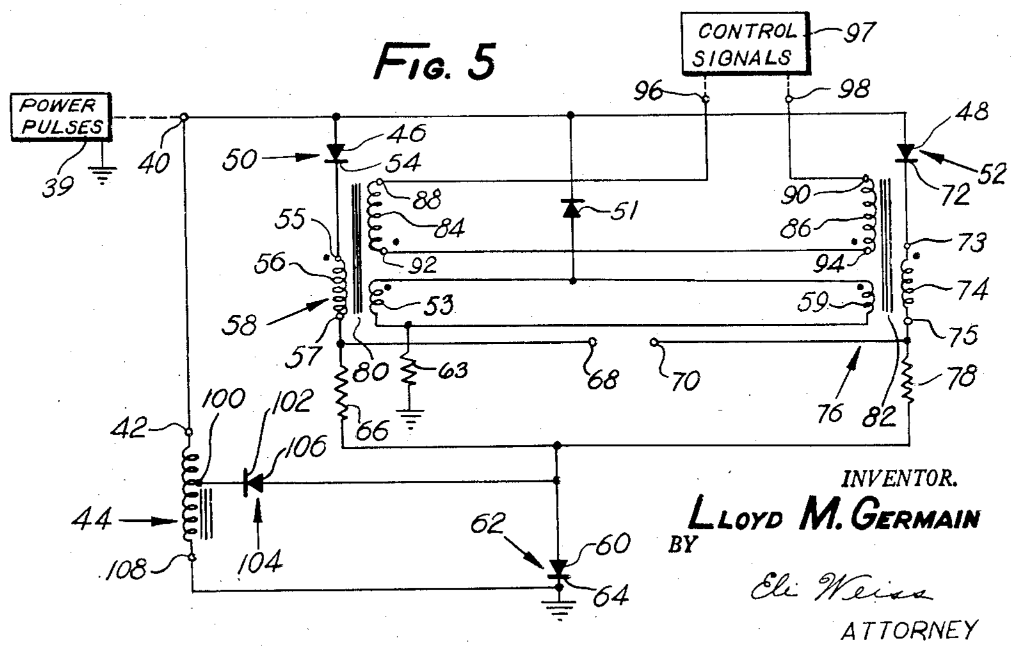
Fig. 5 is a schematic diagram of an amplifier of the magnetic type embodying the principles of the present invention.

Referring to Fig. 5, therein is disclosed a schematic diagram of this invention wherein the back or negative voltage appearing across the crystal diodes is decreased to a minimum value to reduce substantially the drift or leakage current of each crystal diode to provide a magnetic amplifier that is free of drift or errors that can be attributed to the presence of leakage current through crystal diodes.

A source of power pulses 39 is coupled to an input terminal 42 of a tapped transformer 44 and to the anodes 46 and 48 respectively of crystal diodes 50 and 52 through an input terminal 40. The cathode 54 of the diode 50 is coupled to one end 55 of the power winding 56 of the magnetic amplifier coil assemblage 58. The other end 57 of the power winding 56 is coupled to the anode 60 of the crystal diode 62 through a resistor 66. The cathode 64 of the crystal diode 62 is coupled to a ground terminal; and an output terminal 68 is coupled to the interconnecting point of the power winding 56 and the resistor 66.

The cathode 72 of the diode 52 is coupled to one end 73 of the power winding 74 of the magnetic amplifier coil assemblage 76. The other end 75 of the power winding 74 is coupled to the anode 60 of the crystal diode 62 through a resistor 78. An output terminal 70 is coupled to the interconnecting point of the power winding 74 and the resistor 78. The power winding 56 is wound around the core 80 and the power winding 74 is wound around the core 82. The control winding 84, having relatively few turns as compared to the number of turns in the power winding 56, is wound around the magnetic core 80 in a direction opposite to the direction of winding of the power coil 56. A second control winding 86, also having relatively few windings compared to the power winding 74, is wound around the magnetic core 82 in a direction opposite to the direction that the power coil 74 is wound. A source of control signals 97 is coupled to feed two control winding input terminals 96 and 98; the input terminals 96 and 98 are connected respectively to the ends 88 and 90 of the control coils. The other ends 92 and 94 respectively of the control coils 84 and 86 are connected together. A tap terminal 100 positioned to sense approximately two thirds of the total voltage that appears across the transformer 44 is coupled to the cathode 102 of a crystal diode 104, and the anode 106 is coupled to the anode 60 of the crystal diode 62. The end terminal 108 of the transformer 44 is coupled to a ground terminal.

Standard bias windings 53 and 59 are wound around the cores 80 and 92 respectively and in the same direction as their associated power coils. The negative or lower end of each bias coil is coupled to a ground terminal through a common resistor 63. The positive or upper end of each bias coil is connected to receive negative potential signals from the input terminal 40 through the common crystal diode 51. The diode 51 is oriented to pass negative potential signals only.

Thus, the power signals are fed to the terminal 40 and the control signals are fed to the terminals 96 and 98. When one control terminal is at a positive potential the other control terminal is at a negative potential. The output signals appear at the terminals 68 and 70.

At the instant that the power signal is positive, the terminals 40 and 100 are positive. Thus the crystal diodes 50, 52 and 62 pass current, while the crystal diode 104 blocks the flow of current as practically all of the reverse voltage of the terminal 100 is applied across the terminals of the diode 104. When the power signal is negative the terminals 40 and 100 are negative, the crystal diodes 50, 52 and 62 do not pass current, and the crystal diode 104 does conduct current. When the crystal diode 104 conducts current a substantial portion of the back voltage appears across the crystal diode 62, not across the diodes 50 and 52. There is a very small voltage drop across the crystal diode 104 when it passes current and as the diodes 50 and 52 are coupled in parallel with the crystal diode 104 they are subjected to a very small back voltage instead of the usual large back voltage. Thus the leakage current through the crystal diodes 50 and 52 is practically non-existent as the negative voltage across each of the crystal diodes 50 and 52 is reduced to an extremely small ineffective voltage.

In the arrangement shown, the crystal diodes 50 and 52 can have a relatively low back voltage rating; while the crystal diode 62 must pass the current of each of the crystal diodes 50 and 52 and requires a high back voltage rating. The crystal diode 104 must have a high back voltage rating, however, the forward current requirements are small.

Since only small back voltages are applied across the crystal diodes 50 and 52 when the diode 104 is conducting, the diodes 50 and 52 present relatively high back resistance values to practically eliminate leakage or back current.

As mentioned previously, the output signals appear at the terminals 68 and 70, one terminal receives a positive signal while the other terminal receives a negative signal. Thus, if the potential that appears at the terminal 68 is identical to the potential that appears at the terminal 70 there will not be a detectable output signal. To have an output signal there must be a differential of potential on the two output terminals 68 and 70. If a differential control signal is not fed to the input terminals 96 and 98, the magnetic cores will operate about identical points in the positive remanence portion of their respective hystersis curves, their output signals will be identical in magnitude, there will not be a voltage differential between the signals appearing on the output terminals 68 and 70, and thus there will not be an output signal. However, if a differential control signal is fed to the input terminal 96 and differential control signal is fed to the input terminals 96 and 98 during a period when the power signal is negative, then by virtue of the direction of the flow of current in the control windings relative to each other and to their respective power windings, the core 80 will be driven into the positive remanence range of its hysteresis curve while the core 82 will be driven into the negative remanence range of its hysteresis curve. At the occurrence of the next positive pulse of the power signal, the power winding 56 will pass the positive pulse signal while the power winding 74 will inhibit the positive pulse signal. Thus, a potential differential will appear at the output terminals 68 and 70, and an output signal can be detected. If a differential control signal is not fed to the control windings 96 and 98 during the next appearing negative portion of the power wave, then there will not be a detectable output signal at the output terminals 68 and 70 during the next appearing positive pulse of the power wave; the cores having been reset automatically.

Obviously many modifications and variations of the present invention are possible in the light of the above teachings. It is, therefore, to be understood that within the scope of the appended claims the invention may be practiced otherwise than as specifically described.

What is claimed is:

1. A low drift magnetic amplifier comprising a source of power pulses that generates alternately first and second polarity signals, a first magnetic amplifier coil assemblage having a first power winding and a first control winding, a first diode interposed between said source of power pulse and said first magnetic amplifier coil assemblage oriented to feed only first polarity power pulse signals to said first power winding, a second magnetic amplifier coil assemblage having a second power winding and a second control winding, a second diode interposed between said source of power pulses and said second magnetic amplifier coil assemblage oriented to feed only first polarity power pulse signals to said second power winding, a source of control signals coupled to said control windings of said first and second magnetic amplifier coil assemblages to simultaneously inhibit the passage of a first polarity power pulse signal through said first power winding and to pass a first polarity power pulse signal through said second power winding, first and second output terminals coupled respectively to said first and second power windings, and a third diode coupled in parallel with said first diode and said first power winding and said second diode and said second power winding oriented to pass second polarity signals only from said source of power pulses.

2. A low drift magnetic amplifier comprising a source of power pulses that generates alternately first and second polarity signals, a first magnetic amplifier coil assemblage having a first power winding and a first control winding, a first diode interposed between a first output terminal of said source of power pulses and said first magnetic amplifier coil assemblage oriented to feed only first polarity power pulse signals to said first power winding, a second magnetic amplifier coil assemblage having a second power winding and a second control winding, a second diode interposed between said first output terminal of said source of power pulses and said second magnetic amplifier coil assemblage oriented to feed only first polarity power pulse signals to said second power winding, a source of control signals coupled to said control windings of said first and second magnetic amplifier coil assemblages to simultaneously inhibit the passage of a first polarity power pulse signal through said first power winding and to pass a first polarity power pulse signal through said second power winding, first and second output terminals coupled respectively to said first and second power windings, a third diode coupled in parallel with said first diode and said first power winding and said second diode and said second power winding oriented to pass second polarity signals only from said source of power pulses, and a fourth diode interposed between said third diode and a second output terminal of said source of power pulses.

3. A low drift magnetic amplifier comprising a source of power pulses that generates alternately first and second polarity signals, a first magnetic amplifier coil assemblage having a first power winding and a first control winding, a first diode interposed between a first output terminal of said source of power pulses and said first magnetic amplifier coil assemblage oriented to feed only first polarity power pulse signals to said first power winding, a second magnetic amplifier coil assemblage having a second power winding and a second control winding, a second diode interposed between said first output terminal of said source of power pulses and said second magnetic amplifier coil assemblage oriented to feed only first polarity power pulse signals to said second power winding, a source of control signals coupled to said control windings of said first and second magnetic amplifier coil assemblages to simultaneously inhibit the passage of first polarity power pulse signals through said first power winding and to pass first polarity power pulse signals through said second power winding, first and second output terminals coupled respectively to said first and second power windings, a third diode fed by said first and second power windings and coupled to a second output terminal of said source of power pulses, a transformer coupled across the output terminals of said source of power pulses, and a fourth diode coupled to feed second polarity signals from said transformer to said third diode.

4. A low drift magnetic amplifier comprising a source of power pulses, a first magnetic amplifier coil assemblage having a power winding and a control winding, a first crystal diode interposed between said source of power pulses and said first magnetic amplifier coil assemblage to feed positive potential power pulses to said power winding, a second magnetic amplifier coil assemblage having a power winding and a control winding, a second crystal diode interposed between said source of power pulses and said second magnetic amplifier coil as semblage to feed positive potential power pulses to the power winding, a source of control signals coupled to said control windings of said first and second magnetic amplifier coil assemblages to simultaneously inhibit a power pulse through one of the power windings of said magnetic amplifier coil assemblages and to pass a power pulse through the other power winding of said magnetic amplifier coil assemblages, first and second output terminals coupled respectively to the power windings of said first and second magnetic amplifier coil assemblages, a third crystal diode, a first impedance interposed between said first output terminal and said third crystal diode, a second impedance interposed between said second output terminal with said third crystal diode, and voltage polarity sensitive means fed by said source of power pulses and coupled to said third crystal diode to limit the magnitude of the back potential developed across the first and second crystal diodes.

5. A low drift magnetic amplifier comprising a source of power pulses, a first magnetic amplifier coil assemblage having a power winding and a control winding, a first crystal diode interposed between said source of power pulses and said first magnetic amplifier coil assemblage to feed positive potential power pulses to said power winding, a second magnetic amplifier coil assemblage having a power winding and a control winding, a second crystal diode interposed between said source of power pulses and said second magnetic amplifier coil assemblage to feed positive potential power pulses to the power winding, a source of control signals coupled to said control windings of said first and second magnetic amplifier coil assemblages to simultaneously inhibit a power pulse through one of the power windings of said magnetic amplifier coil assemblages and to pass a power pulse through the other power winding of said magnetic amplifier coil assemblages, first and second output terminals coupled respectively to the power windings of said first and second magnetic amplifier coil assemblages, a third crystal diode, a first impedance interposed between said first output terminal and said third crystal diode, a second impedance interposed between said second output terminal and said third crystal diode, a voltage divider fed by said source of power pulses, and a fourth crystal diode fed by said voltage divider and coupled to said first and second crystal diodes to limit the magnitude of the back potential developed across the first and second crystal diodes.

6. The combination defined in claim 5 wherein said voltage divider comprises a transformer.

7. The combination defined in claim 5 wherein said voltage divider comprises a tapped transformer.

8. The combination defined in claim 5 wherein the signals for the source of power pulses are one hundred and eighty degrees out of phase with the signals from the source of control signals.

9. A low drift magnetic amplifier comprising a source of power pulses, a first magnetic amplifier coil assemblage having a power winding and a control winding, a first crystal diode interposed between said source of power pulses and said first magnetic amplifier coil assemblage to feed positive potential power pulses to said power winding, a second magnetic amplifier coil assemblage having a power winding and a control winding, a second crystal diode interposed between said source of power pulses and said second magnetic amplifier coil assemblage to feed positive potential power pulses to the power winding, a source of control signals coupled to said control windings of said first and second magnetic amplifier coil assemblages to simultaneously inhibit a power pulse through one of the power windings of said magnetic amplifier coil assemblages and to pass a power pulse through the other power winding of said magnetic amplifier coil assemblages, first and second output terminals coupled respectively to the power windings of said first and second magnetic amplifier coil assemblages, a third crystal diode, and voltage divider means fed by said source of power pulses and coupled to said third crystal diode to limit the magnitude of the back potential developed across the first and second crystal diodes.

10. The combination defined in claim 9 wherein said voltage divider means comprises a transformer.

References Cited in the file of this patent

UNITED STATES PATENTS

| | | |
|---|---|---|
| 2,516,563 | Graves | July 25, 1950 |
| 2,773,134 | Dunnet | Dec. 4, 1956 |
| 2,798,904 | Alexanderson | July 9, 1957 |

OTHER REFERENCES

Electronic Engineering, vol. 26, No. 315, May 1954, pps. 180–185 ("High Speed Magnetic Amplifiers," by A. E. Maine, particularly Fig. 8), 179–171.MA.

UNITED STATES PATENT OFFICE

CERTIFICATE OF CORRECTION

April 28, 1959

Patent No. 2,884,493

Lloyd M. Germain

It is hereby certified that error appears in the printed specification of the above numbered patent requiring correction and that the said Letters Patent should read as corrected below.

Column 2, line 59, for "(+);" read -- (+Br); --.

Signed and sealed this 25th day of August 1959.

(SEAL)

Attest:

KARL H. AXLINE

Attesting Officer

ROBERT C. WATSON

Commissioner of Patents